United States Patent
Wake et al.

(10) Patent No.: US 6,858,832 B2
(45) Date of Patent: Feb. 22, 2005

(54) PHOTOELECTRIC SENSOR HAVING TIME CHANGING MEANS

(75) Inventors: Toru Wake, Kasugai (JP); Daisuke Hayakawa, Kasugai (JP)

(73) Assignee: Sunx Limited, Aichi (JP)

( * ) Notice: Subject to any disclaimer, the term of this patent is extended or adjusted under 35 U.S.C. 154(b) by 312 days.

(21) Appl. No.: 10/281,121

(22) Filed: Oct. 28, 2002

(65) Prior Publication Data

US 2003/0080284 A1 May 1, 2003

(30) Foreign Application Priority Data

Oct. 29, 2001 (JP) .................................... 2001-331504
Dec. 27, 2001 (JP) .................................... 2001-397471

(51) Int. Cl.[7] .............................................. H01J 40/14
(52) U.S. Cl. .................................... 250/221; 250/578.1
(58) Field of Search ........................... 250/221, 222.1, 250/208.2, 578.1; 340/555, 556, 557

(56) References Cited

U.S. PATENT DOCUMENTS 3,970,846 A * 7/1976 Schofield et al. ........... 250/221

5,852,292 A 12/1998 Blümke et al.

FOREIGN PATENT DOCUMENTS

| DE | 10136242 | 5/2002 |
|----|----------|--------|
| FR | 2813129 | 2/2002 |
| JP | 57-136179 | 8/1982 |
| JP | 6-350428 | 12/1994 |
| JP | 10-41802 | 2/1998 |
| JP | 2911369 | 4/1999 |

* cited by examiner

*Primary Examiner*—Que T. Le
(74) *Attorney, Agent, or Firm*—Wenderoth, Lind & Ponack, L.L.P.

(57) ABSTRACT

Detection of interfering light is performed based on an interfering light detection timing signal Si set immediately before a blockage detection timing signal Sr. If interfering light is detected consecutively with respect to the same optical axis according to interfering light detection timing, the length of blank period tb is reduced to shift the positions of pulses of the blockage detection timing signal, thereby avoiding overlap between these pulses and pulses of interfering light on the time axis. In this manner, mutual interference between multiple-axis photoelectric sensors can be prevented without providing sync line wiring between the photoelectric sensors.

14 Claims, 18 Drawing Sheets

PHOTOELECTRIC SENSOR HAVING TIME CHANGING MEANS

BACKGROUND OF THE INVENTION

1. Field of the Invention

The present invention relates to a photoelectric sensor and, more particularly, to an arrangement in which mutual interference between photoelectric sensors is prevented.

2. Description of the Prior Art

As this kind of photoelectric sensor, a multiple-axis photoelectric sensor disclosed in Japanese Patent Publication No. 2911369 is known. In this photoelectric sensor, a light-projecting device having a plurality of light-projecting elements and a light-receiving device having a plurality of light-receiving elements are opposed to each other and each light-projecting element and the corresponding light-receiving element form an optical axis. A light-projecting scanning operation is repeatedly performed in such a manner that the light-projecting elements provided in the light-projecting device successively project light according to predetermined light-projecting timing. A state in which light from each light-projecting element is blocked at the optical axis is detected on the basis of a received light signal from the light-receiving element which forms the optical axis in association with the light-projecting element. Through the blocked state of light thereby detected, entering of an object into the detection area is sensed.

A plurality of multiple-axis photoelectric sensors may be disposed to detect entering of an object into a wider area. For example, multiple-axis photoelectric sensors may be placed close to each other as shown in FIG. 20. In such a case, when a blocked state at one of the optical axes of the multiple-axis photoelectric sensor 111 in the upper position, for example, is detected, there is a possibility of light projected from the multiple-axis photoelectric sensor 112 in the lower position entering as interfering light into the light-receiving element of the upper multiple-axis photoelectric sensor 111. In such a situation, an error in operation may occur such that when light from the upper multiple-axis photoelectric sensor 111 is blocked at the optical axis, interfering light entering from the lower multiple-axis photoelectric sensor 112 causes failure to detect the blocked state at the optical axis.

To avoid such mutual interference, it is necessary to control the light-projecting scanning operation so that the periods of projection from the multiple-axis photoelectric sensors placed close to each other do not overlap each other. To do so, a sync method is ordinarily used in which one of the two multiple-axis photoelectric sensors 111 and 62 is set as a master station while the other is set as a slave station, a sync signal is transmitted from the master station to the slave station, and the slave station performs the scanning operation with a phase difference from the master station. If this method is used, the multiple-axis photoelectric sensor 112 does not perform detection of a received light signal when one of the light-projecting elements of the other multiple-axis photoelectric sensor 111 is being lighted. Thus, this method has the advantage of preventing the above-described mutual interference.

However, the above-described sync method has a problem in that a troublesome wiring operation is required and the number of operation steps accompanying installation of the devices is large.

Also, this kind of multiple-axis photoelectric sensor is ordinarily arranged to perform an operation for detection as to whether a received light signal is generated from each of light-receiving element at a time when none of light-projecting element is lighted to determine whether interfering light exists. If a synchronization error occurs accidentally in the sync system to cause a coincidence between lighting and timing of detection of interfering light, interfering light is periodically detected since the light-projecting scanning operation is being performed essentially in constant cycles, resulting in determination that a sensor abnormality has occurred.

Also in the case where a plurality of photoelectric sensors each formed of a pair of light-projecting and light-receiving elements are disposed adjacent to each other, interfering light from one of the photoelectric sensors may enter another of the photoelectric sensors to cause an error in operation. To prevent such mutual interference, a method has been proposed in which the photoelectric sensors are connected by a sync line as in the above-described multiple-axis photoelectric sensor, and in which light-projecting timing is controlled so that the photoelectric sensors perform projection and receiving of light at different times. However, the connection of the sync line is also troublesome and there is a need to provide a wiring space. Therefore, it is desirable for ordinary users to avoid use of the sync line.

A method for preventing mutual interference without using a sync line is disclosed in Japanese Patent Laid-Open No. 57-136179. According to this method, the influence of interfering light is avoided by monitoring, at one of a plurality of photoelectric sensors, the entrance of light from another of the photoelectric sensors immediately before the light-projecting time, determining that interfering light from another of the photoelectric sensors is received when the interfering light is received, and shifting the light-projecting time to a later time (away from the time at which interfering light is received).

Each of the above-described methods enables prevention of mutual interference in the case where there are two photoelectric sensors interfering with each other. However, in the case where there are three photoelectric sensors interfering with each other, the method has a drawback described below. That is, the light-projecting period of each photoelectric sensor is determined with reference to a clock oscillated by internal oscillation means. This oscillation means is arranged to output an oscillated clock with a predetermined oscillation period, but has a slight error in the period for each photoelectric sensor. Therefore, in the case where the interval between the time at which light is to be projected from one of the photoelectric sensors and the time at which interfering light comes from another of the photoelectric sensors before the projection of light is gradually reduced by delay of the time of arrival of interfering light, and where the time of projection from the photoelectric sensor from which light is about to be projected is shifted to a later time, light projected from this photoelectric sensor may be superimposed on interfering light subsequently projected from another of the photoelectric sensors. In such a case, mutual interference cannot be prevented.

SUMMARY OF THE INVENTION

In view of the above-described circumstances, a first object of the present invention is to provide a multiple-axis photoelectric sensor which, when operating in a group of a plurality of the same multiple-axis photoelectric sensors, is capable of preventing mutual interference between the photoelectric sensors without sync-line wiring.

Another object of the present invention is to provide a photoelectric sensor capable of reliably avoiding the influence of interfering light even in an environment in which it is subjected to interference from other photoelectric sensors.

In the case where a plurality of multiple-axis photoelectric sensors may be disposed close to each other, if the photoelectric sensors project light in the same cycles, the time at which one of the multiple-axis photoelectric sensors projects light and the time at which another of the multiple-axis photoelectric sensors projects light may overlap each other on the time axis to cause mutual interference. In a multiple-axis photoelectric sensor of the present invention arranged to solve this problem, when light-receiving elements output received light signals when none of light-projecting elements is lighted, interfering light is detected by interfering-light detection means on the basis of the received light signals. When the interfering light is detected, the time at which a light-projecting scanning operation of light-projecting control means is started is changed. The possibility of overlap between the times at which the two multiple-axis photoelectric sensors emit light is thereby eliminated to prevent mutual interference.

In the photoelectric sensor of the present invention, the interfering-light detection means monitors entrance of interfering light from other photoelectric sensors on the basis of the received light signals from the light-receiving means using the non-projecting period. In this photoelectric sensor, even in the case where the timing of detection of interfering light from one of the other photoelectric sensor is shifted due to execution of a shift of the light-projecting timing in accordance with some of shift patterns in another photoelectric sensor, changing means selects a shift pattern such as to avoid overlap between the detection timing and the light-projecting timing in this photoelectric sensor, and shifts the light-projecting timing in accordance with the selected shift pattern, thus preventing overlap between the detection timing and the light-projecting timing irrespective of the shift pattern in which interfering light from another photoelectric sensor is shifted.

In the case where the interfering light from another photoelectric sensor detected by the interfering-light detection means is about to overlap the light-projecting timing of the light-projecting means, the changing means executes a shift in accordance with the first shift pattern whereby the light-projecting timing is shifted by a small amount away from the time of arrival of interfering light. In the case where interfering lights from two of the other photoelectric sensors are about to overlap the light-projecting timing simultaneously from opposite directions, the changing means executes a shift in accordance with the second shift pattern whereby the light-projecting timing is shifted so as to jump the time of arrival of one of the interfering lights. In the case where the time of arrival of interfering light from another photoelectric sensor is at a point spaced apart by a predetermined amount from the light-projecting timing larger than the amount of shift in the second shift pattern, the changing means executes a shift in accordance with the third shift pattern whereby the light-projecting timing is shifted so that the point spaced apart by the predetermined amount from the time of arrival of interfering light is maintained even if the timing of detection of interfering light from another photoelectric sensor is shifted.

According to the above-described arrangement, it is possible to prevent occurrence of overlap between the time of arrival of interfering light from another photoelectric sensor and the light-projecting timing due to execution of a shift in accordance with the first or second shift pattern. In a situation where this and other photoelectric sensors detect interfering light from each other, it is possible to predict a point to which the time of arrival of interfering light from another photoelectric sensor is shifted. However, in a situation where interfering light from another photoelectric sensor enters the light-receiving means of this photoelectric sensor but light projected from this photoelectric sensor does not enter another photoelectric sensor, there is a possibility of the time of arrival of interfering light from another photoelectric sensor being abruptly shifted largely by the second shift pattern.

Therefore, in the case where the time of arrival of interfering light from another photoelectric sensor is at a point spaced apart by a predetermined amount from the light-projecting timing larger than the amount of shift in the second shift pattern, the changing means executes a shift in accordance with the third shift pattern whereby the light-projecting timing is shifted so that the point spaced apart by the predetermined amount from the time of arrival of interfering light is maintained even if the timing of detection of interfering light from another photoelectric sensor is shifted. If such a shift is executed, overlap between the time of arrival of interfering light and the light-projecting timing can be avoided even though there is a possibility of the time of arrival of interfering light from another photoelectric sensor being abruptly shifted largely by the second shift pattern.

Further, if the interval between the interfering lights from two of the other photoelectric sensors is larger than the amount of shift in the second shift pattern in the case where the changing means shifts the light-projecting timing with respect to the interfering lights from the other two photoelectric sensors, the changing means executes a shift in accordance with the fourth shift pattern with priority over a shift in accordance with the third shift pattern whereby the light-projecting timing is shifted so that the time of arrival of one of the interfering lights from the other two photoelectric sensors closer to the light-projecting timing is set adjacent to the light-projecting timing opposite from the direction of shift in the second shift pattern.

According to this arrangement, although there is a possibility of the time of arrival of interfering light being abruptly shifted largely by execution of a shift in accordance with the second shift pattern in one of the two photoelectric sensors when interfering light is received from the two photoelectric sensors, only the interfering light from the photoelectric sensor closer to the light-projecting timing may be considered if the interval between the times of arrival of interfering light from the two photoelectric sensors is larger than the amount of shift in the second shift pattern. Therefore the changing means executes a shift in accordance with the fourth shift pattern whereby the light-projecting timing is shifted so that the time of arrival of interfering light from the photoelectric sensor closer to the light-projecting timing is set adjacent to the light-projecting timing opposite from the direction of shift in the second shift pattern. In this manner, it is possible to reduce the light-projecting period and to prevent a reduction in response while avoiding the influence of interfering light.

Also, count means for counting the number of interfering lights from other photoelectric sensors detected by said interfering-light detection means during one non-projecting period may be provided and alarm means for notifying an inability to prevent interference if the count value of the count means exceeds the number at which interference can be avoided may also be provided. According to this arrangement, the interference avoidance operation by the changing means is inhibited when the number of interfering lights exceeds the number at which interference can be avoided. In such a case, a notice of an inability to prevent interference may be issued according to the excess of the count value to urge the user to take steps to avoid interference.

DETAILED DESCRIPTION OF THE PREFERRED EMBODIMENTS

<First Embodiment>

A first embodiment of the present invention will be described with reference to FIGS. 1 to 5.

Figure 1:
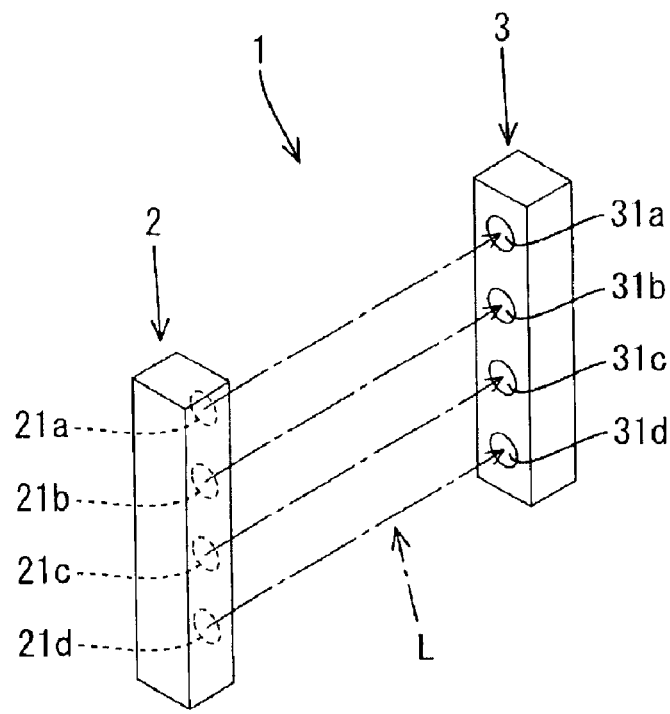
FIG. 1 is a perspective view of the construction of a multiple-axis photoelectric sensor which represents a first embodiment of the present invention.
Figure 1:
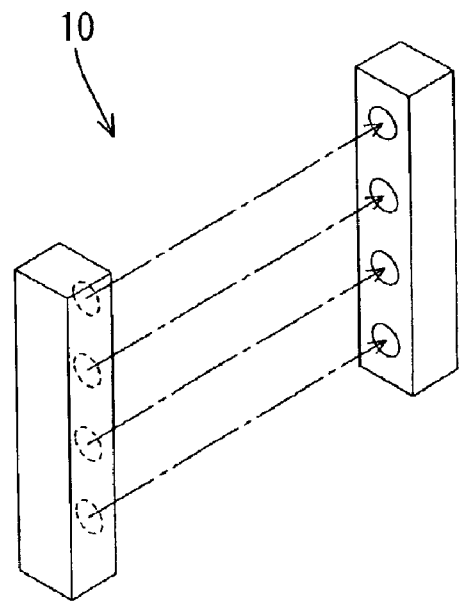

A multiple-axis photoelectric sensor 1 of this embodiment is constituted by a light-projecting device 2 and a light-receiving device 3 opposed to each other, as shown in FIG. 1. The multiple-axis photoelectric sensor has, for example, optical axes L for four channels. Four light emitting diodes (LEDs) 21a to 21d each corresponding to one channel are arranged in a vertical row in the surface of the light-projecting device 2 facing the light-receiving device 3, while photodiodes 31a to 31d (hereinafter referred to as PDs 31a to 31d) respectively forming pairs with the LEDs 21a to 21d are arranged in a vertical row in the surface of the light-receiving device 3 facing the light-projecting device 2. Therefore LEDs 21a to 21d correspond to the light-projecting elements while the PDs 31a to 31d correspond to the light-receiving elements respectively forming pairs with the light-projecting elements to form an optical axis. Also, a multiple-axis photoelectric sensor 10 is placed below and close to the multiple-axis photoelectric sensor 1 as viewed in FIG. 1.

Figure 2:
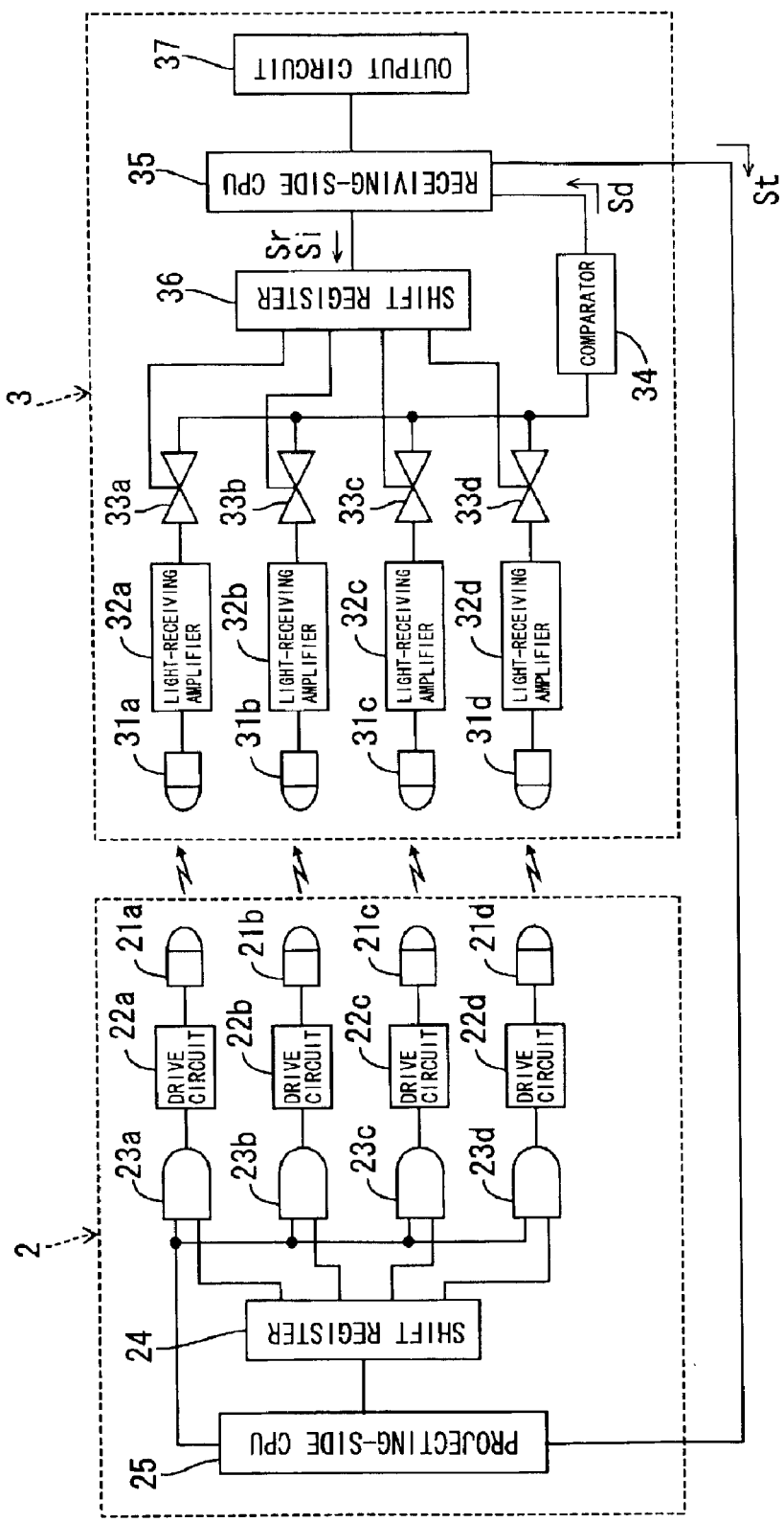
FIG. 2 is a circuit diagram showing the electrical configuration of the multiple-axis photoelectric sensor.

FIG. 2 shows the electrical configuration of the multiple-axis photoelectric sensor 1. The light-projecting device 2 has drive circuits 22a to 22d, which respectively supply drive currents to the LEDs 21a to 21d when receiving signals from AND circuits 23a to 23d. Output signals from a shift register 24 and a projecting-side CPU 25 are input to the AND circuits 23a to 23d. When both the signals from the shift register 24 and the projecting-side CPU 25 are input to each AND circuit, the AND circuit sends a signal to a corresponding one of the drive circuits 22a to 22d. The projecting-side CPU 25 receives a light-projecting timing signal St from a receiving-side CPU 35 provided in the light-receiving device 23 as described below, and outputs the light-projecting timing signal St to the shift register 24 and the AND circuits 23a to 23d.

This light-projecting timing signal St is a pulse signal having a predetermined period and generated by the receiving-side CPU 35 to determine timing of lighting of the LEDs 21a to 21d. Four pulses are generated in one period (length T) of light-projecting timing signal St at equal intervals with an intervening period of time ta, and a blank period tb of a predetermined length is set after the fourth pulse. A light-projecting scanning operation whereby the four LEDs 21a to 21d are successively lighted from the uppermost one to the lowermost one is performed in every period T. Thus, the AND circuits 23a to 23d, the shift register 24, and projecting-side CPU 25 and the receiving-side CPU 35 constitute light-projecting control means for successively lighting the group of light-projecting elements by predetermined timing.

On the other hand, the light-receiving device 3 has light-receiving amplifiers 32a to 32d for amplifying received light signals from the PDs 31a to 31d at a predetermined degree of amplification. Received light signals output from the light-receiving amplifiers 32a to 32d are taken into a comparator 34 via analog switches 33a to 33d and a common signal line. When the level of received light signal exceeds a reference value set in the comparator 34, an entering-light detection signal Sd is input from the comparator 34 to the receiving-side CPU 35, thus detecting the entrance of light.

The receiving-side CPU 35 supplies a shift register 36 with a blockage detection timing signal Sr equal in period and phase to the above-mentioned light-projecting timing signal St and an interfering-light detection timing signal Si slightly phase-advanced relative to the blockage detection timing signal Sr. The shift register 36 supplied with the blockage detection timing signal Sr and the interfering-light detection timing signal Si from the receiving-side CPU 35 supplies a gate control signal to each of the analog switches 33a to 33d connected to the shift register 36 in the order from the analog switch 33a to the analog switch 33d to turn on these switches, thereby enabling each of the received light signals from the PDs 31a to 31d to be input to the comparator 34. When the blockage detection timing signal Sr is supplied, one of the LED 21a to 21d is in the lighted state and detection of blockage of light is performed with reference to the existence/nonexistence of the entering-light detection signal from the comparator 34. When the interfering-light detection timing signal Si is supplied, each of the LEDs 21a to 21d is not lighted and detection of interfering light is performed with reference to the existence/nonexistence of the entering-light detection signal from the comparator 34.

The operation of the receiving-side CPU 35 will be described also with reference to FIGS. 3 to 5. When power for the multiple-axis photoelectric sensor 1 is turned on, the receiving-side CPU 35 sends out light-projecting timing signal St to the projecting-side CPU 25 to make this CPU repeat the light-projecting scanning operation in period T, as shown in FIG. 2. The receiving-side CPU 35 also supplies blockage detection timing signal Sr and interfering-light detection timing signal Si to the shift register 36 to make this shift register turn on the analog switches 33a to 33d one after another to input the received light signals from the PDs 31a to 31d to the comparator 34, thus performing detection of blockage and interference.

<Detection of Blockage>

Figure 3:
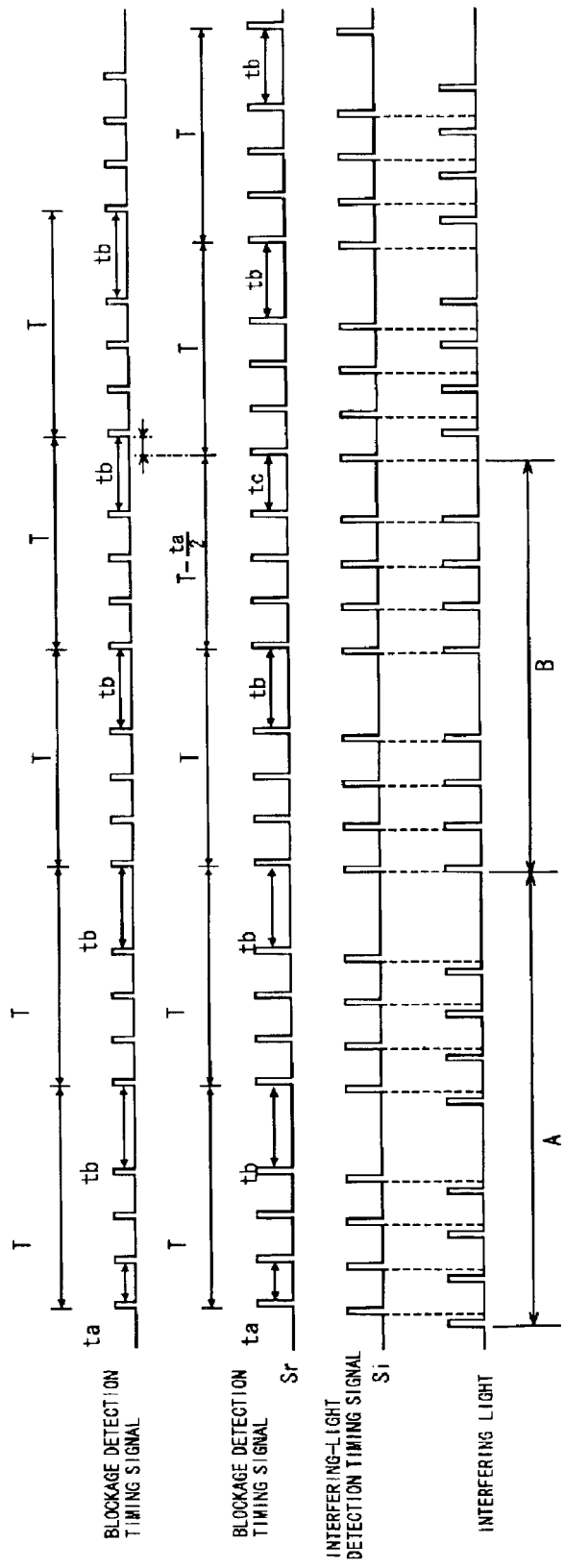
FIG. 3 is a timing chart showing the operation of the multiple-axis photoelectric sensor.
Figure 4:
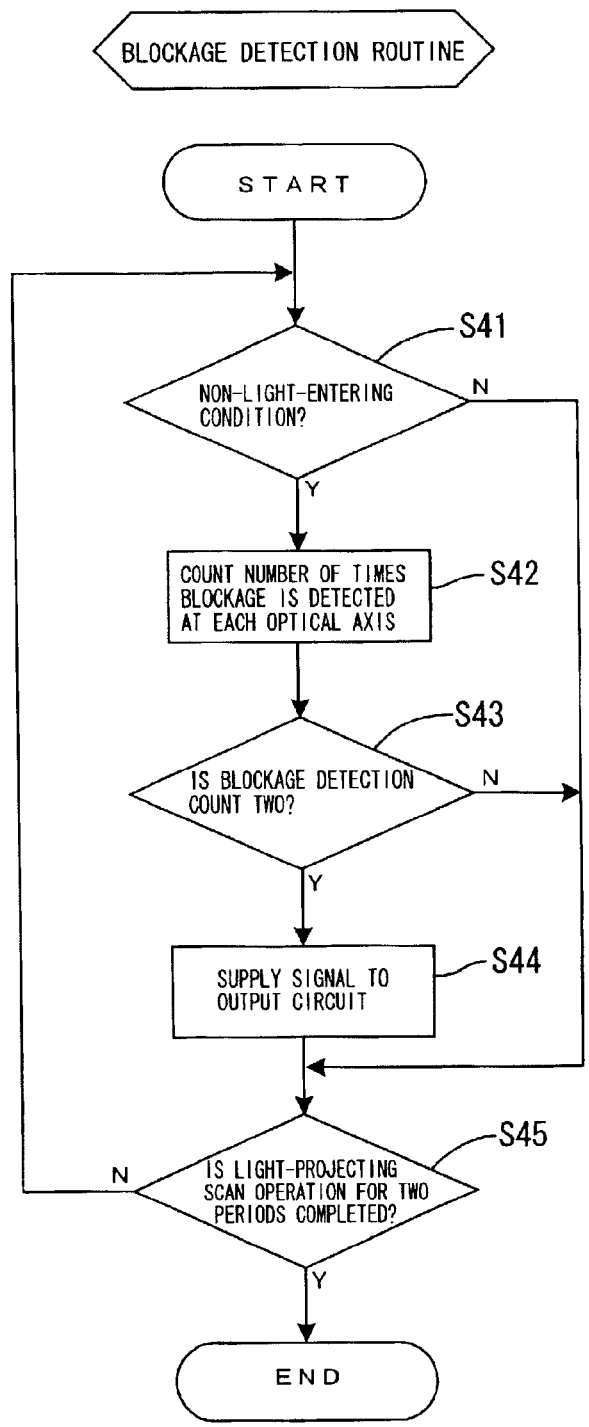
FIG. 4 is a flowchart of a blockage detection routine.

When the level of blockage detection timing signal Sr is high level (H) as shown in the timing chart of FIG. 3, a blockage detection routine shown in FIG. 4 is executed. For example, when there is no object blocking light on any of the optical axes, light from each of the LEDs 21a to 21d enters the corresponding one of the PDs 31a to 31d and the entering-light detection signal from the comparator 34 is therefore output to the receiving-side CPU 35 during detection of blockage of light to each of the PDs 31a to 31d. Accordingly, the receiving-side CPU 35 determines that light is entering each of the PDs 31a to 31d (No in S41).

If light is blocked at the optical axis formed by the PD 31a, the entering-light detection signal is not output from the comparator 34 even when analog switch 33a to which the PD 31a is connected is turned on, it is therefore determined that no light is entering the PD (Yes in S41), and the detection of blockage of light is counted (S42). Light from each of the LEDs 21b to 21d enters the corresponding one of the PDs 31b to 31d, and the result of step S41 with respect to each of the PDs 31b to 31d is therefore "No". In the next period, detection of blockage of light to the PDs 31a to 31d is again performed. At the time of detection of blockage with respect to the PD 31a, the entering-light detection signal is not output from the comparator 34 and it is therefore determined that no light is entering the PD 31a (Yes in S41). The blockage detection count is then incremented (S42) and it is determined that blockage of light has been detected at two consecutive times at the optical axis formed by the PD 31a (Yes in S43). Therefore a signal is output to an output circuit 37 (S44) to make this circuit perform processing relating to the blockage of light. When detection of blockage of light with respect to the lowermost PD 31d is completed (Yes in S45), the blockage detection count is reset and the above-described operation is repeated. As is apparent from the above description, the analog switches 33a to 33d, the comparator 34, the receiving-side CPU 35 and the shift register 36 function as blockage detection means for detecting blockage of light at each optical axis.

<Detection of Interfering Light>

Figure 5:
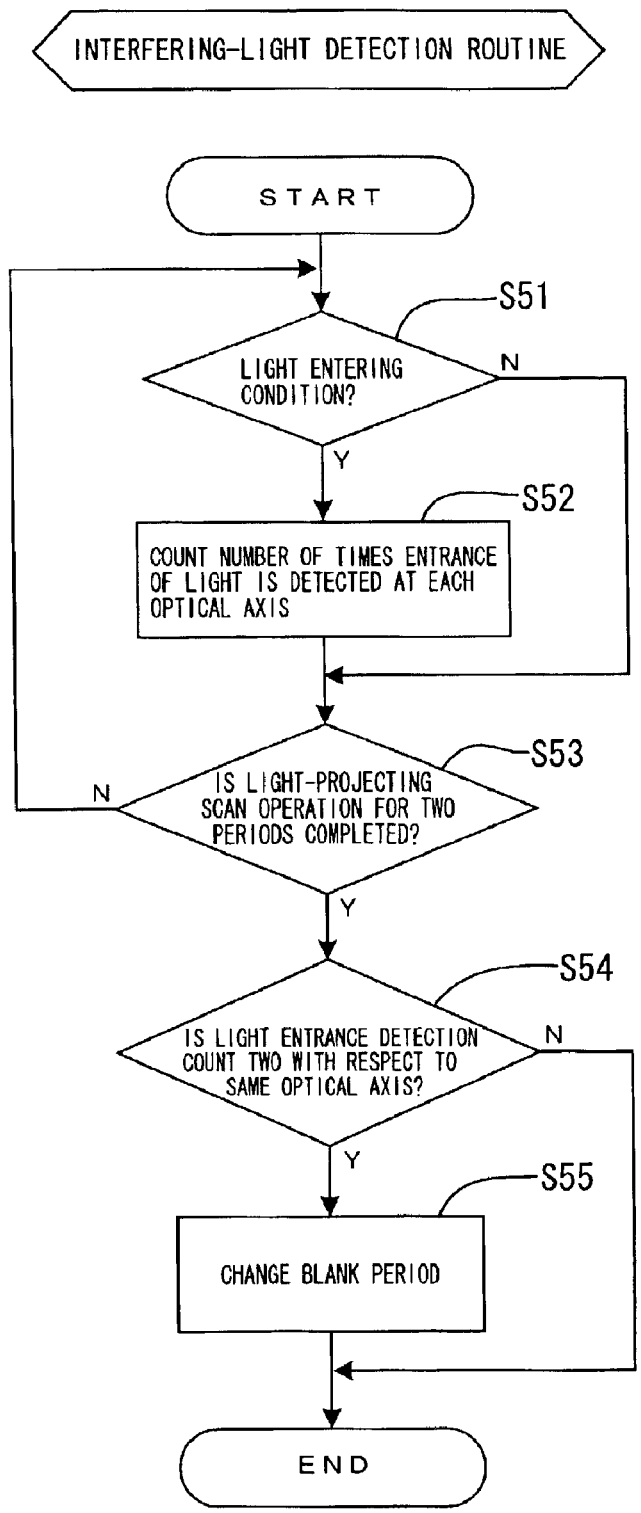
FIG. 5 is a flowchart of an interfering light detection routine.

On the other hand, when the level of interfering-light detection timing signal Si is high, an interfering-light detection routine shown in FIG. 5 is executed. Ordinarily, light from any of the light-projecting elements of the multiple-axis photoelectric sensor 10 does not enter the multiple-axis photoelectric sensor 1 in the time period during which detection of blockage of light through the multiple-axis photoelectric sensor 1 is performed (corresponding to the period A shown in FIG. 3) because the blockage detection timing signal Sr of the multiple-axis photoelectric sensor 1 and the blockage detection timing signal of the other multiple-axis photoelectric sensor 10 are not synchronized and not in phase with each other. Therefore, in the time period during which detection of interfering light is performed, even when the received light signals from the PDs 31a to 31d are successively made effective by the analog switches 33a to 33d, the entering-light detection signal is not output from the comparator 34 and it is determined that no light is entering any of the PDs 31a to 31d (No in S51) Consequently, entrance of interfering light is not recognized.

Conversely, since the multiple-axis photoelectric sensors 1 and 10 operate independently of each other, there is a possibility of timing of detection of blockage of light to be received by the multiple-axis photoelectric sensor 10 being delayed to such an extent that the time period during which detection of blockage of light is performed overlaps on the time axis the time period during which detection of interfering light the multiple-axis photoelectric sensor 1 is performed. In such a case, light from some of the light-projecting elements of the multiple-axis photoelectric sensor 10 enters the multiple-axis photoelectric sensor 1 in the time period during which the multiple-axis photoelectric sensor 1 performs detection of interfering light (corresponding to the period B shown in FIG. 3). First, it is determined that interfering light has entered the PD 31a at the uppermost optical axis (Yes in S51) and the detection of entering light is counted (S52). Subsequently, it is determined that interfering light has also entered the PD 31b at the next optical axis (Yes in S51) and the detection of entering light detection count is counted (S52). It is also determined that light has entered each of the PD 31c and 31d (Yes in S51, S52). Then, detection of interfering light to the PDs 31a to 31d is again performed. After the completion of detection of interfering light to the PD 31d at the lowermost stage (Yes in S53), determination as to the entrance of interfering light is made from the interfering light detection count with respect to each optical axis. Since the detection count with respect to each axis is two, it is finally determined that interfering light has entered (Yes in S54). Then, the blank period tb before the generation of the next pulse of interfering-light detection timing signal Si is changed to a shorter blank period tc by being reduced by half of the time period ta between each adjacent pair of pulses of blockage detection timing signal Sr (S55). The pulse train of blockage detection timing signal Sr is shifted leftward as viewed in FIG. 3 relative to the pulse train of this signal (in the top section in FIG. 3) in the case where the blank period tb is not reduced. Also, as is apparent from the above description of the operation, the analog switches 33a to 33d, the comparator 34, the receiving-side CPU 35 and the shift register 36 function as changing means for changing the time at which the light-projecting scanning operation of the light-projecting control means is started.

As described above, in the multiple-axis photoelectric sensor 1 of this embodiment, if light enters at two consecutive times with respect to each of the optical axes in detection of interfering light, the blank period tb is reduced by a length of time corresponding to half of the time period ta between each adjacent pair of pulses of blockage detection timing signal Sr. If the detected interfering light is periodic interfering light emitted from the other multiple-axis photoelectric sensor 10, the positional relationship between the time at which blockage of light is detected and the time at which the interfering light arrives after the change of the blank period is such that the interval between these times on the time axis is maximized, thus avoiding entrance of interfering light to reliably prevent mutual interference. Also, since the other multiple-axis photoelectric sensor 10 operates independently of the multiple-axis photoelectric sensor 1, there is no need for a sync line for synchronization with the other multiple-axis photoelectric sensor 10 and the wiring layout can therefore be simplified.

<Second Embodiment>

A second embodiment of the present invention will be described with reference to FIGS. 6 to 19.

Figure 6:
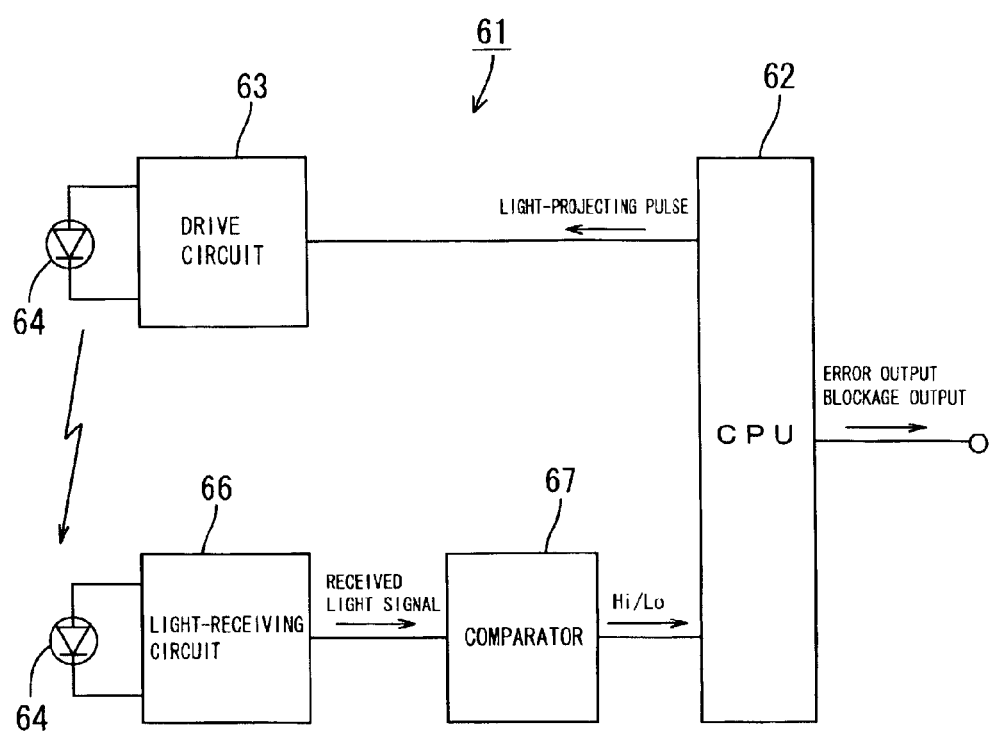
FIG. 6 is a block diagram schematically showing an electrical configuration of a second embodiment of the present invention.

FIG. 6 schematically shows the electrical configuration of a single-optical-axis photoelectric sensor 61. Referring to FIG. 6, a CPU 62 (corresponding to control means, blockage detection means, interfering-light detection means, changing means, count means, and alarm means) of the photoelectric sensor 61 outputs a light-projecting pulse to a drive circuit 63 by predetermined timing to project light from a light-projecting element 64 (corresponding to light-projecting means).

A light-receiving element 65 is provided by being opposed to the light-projecting element 64. The light-receiving element 65 (corresponding to light-receiving means) is arranged to output a received light signal corresponding to light received from the light-projecting element 64. A light-receiving circuit 66 discriminates and amplifies an ac signal contained in the received light signal output from the light-receiving element 65 and outputs the amplified signal.

A comparator 67 compares the received light signal from the light-receiving circuit 66 with a predetermined reference value and outputs a high level signal if the signal level of the received light signal is higher than the reference value. When the CPU 62 is supplied with a low level signal from the comparator 67 simultaneously with drive of the light-projecting device 64, it determines that an object to be detected is positioned between the light-projecting element 64 and the light-receiving element 65 and generates a blockage output.

The CPU 62 is arranged to execute an operation for avoiding interference. This interference avoidance operation executed by the CPU 62 will be described.

Figure 7:
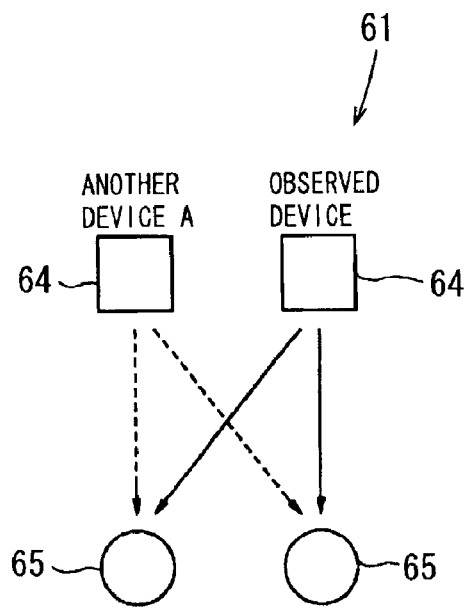
FIG. 7 is a schematic diagram showing an arrangement in which interfering light is received from another device.
Figure 8:
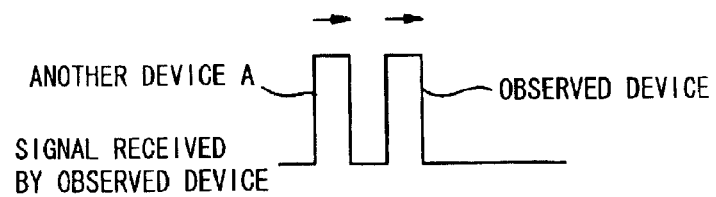
FIG. 8 is a timing chart showing a received light signal.

(1) In the case where, as shown in FIG. 7, two photoelectric sensors 61 (assumed to be a device 61 whose operation is observed and another device A, a square symbol representing light-projecting element 64, a circular symbol representing light-receiving element 65) are disposed in parallel with each other, and where interfering light from the light-projecting device 64 from another device A enters the light-receiving element 65 of the observed device 61, the observed device 61 monitors interfering light from another device A during non-projecting period and slightly shifts the time at which it projects light away from the time of arrival of interfering light from another device A in accordance with a first shift pattern if the time of arrival of interfering light from another device A is about to overlap the time at which it projects light (see FIG. 8), thus executing an interference avoidance operation for avoiding the influence of interfering light from another device A.

Figure 9:
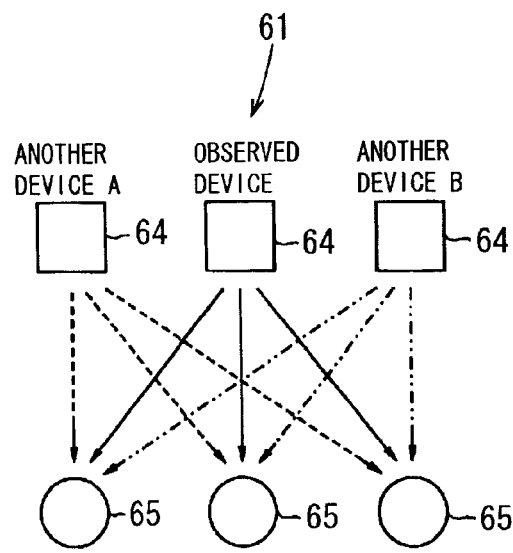
FIG. 9 is a schematic diagram showing an arrangement in which interfering light is received from other two devices.
Figure 10:
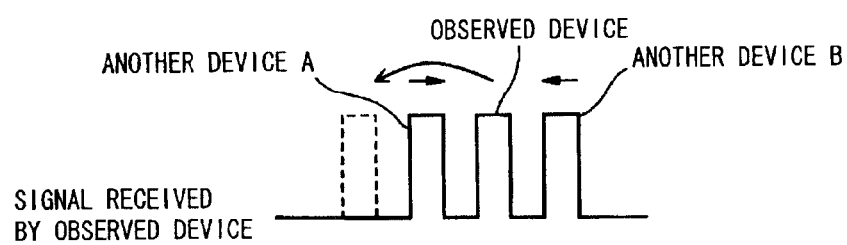
FIG. 10 is a timing chart showing received light signals.

(2) In the case where, as shown in FIG. 9, three photoelectric sensors 61 (assumed to be a device 61 whose operation is observed and another devices A and B) are disposed in parallel with each other, and where interfering light from the light-projecting device 64 from another devices A and B enters the observed device 61, the observed device 61 shifts the light-projecting time in accordance with the first shift pattern if the time of arrival of interfering light from another device A or B is about to overlap its light-projecting time, or largely shifts the light-projecting time in accordance with a second shift pattern by jumping the time of arrival of interfering light from another device A before the light-projecting time if the times of arrival of interfering light from another devices A and B are about to simultaneously overlap its light-projecting time from the opposite directions (see FIG. 10), thus executing an interference avoidance operation for avoiding the influence of interfering light from another devices A and B.

Figure 11:
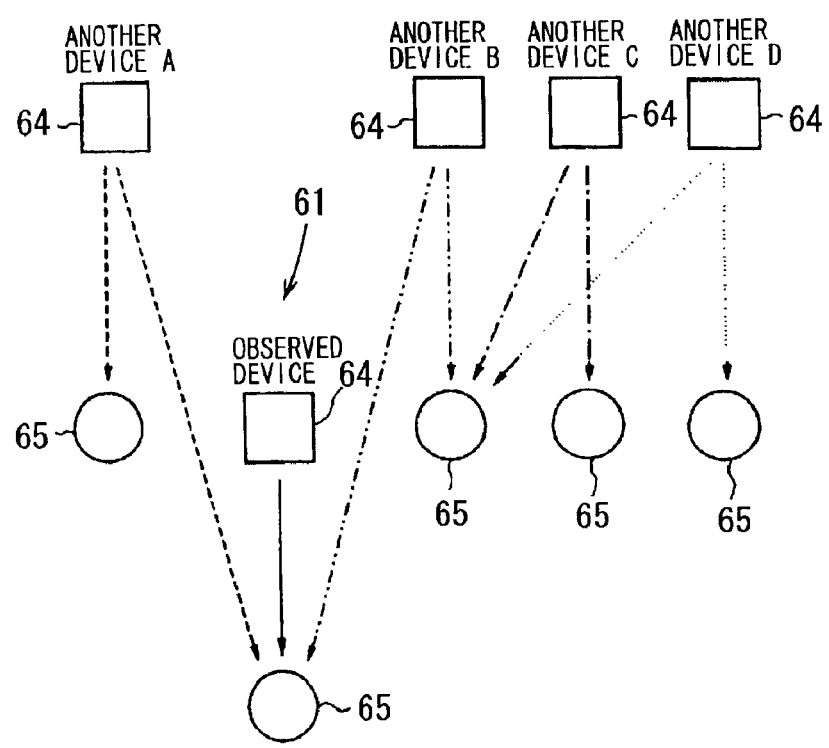
FIG. 11 is a diagram showing an arrangement in which interfering light is received from other two devices but one of another devices does not receive interfering light from the observed device.
Figure 12:
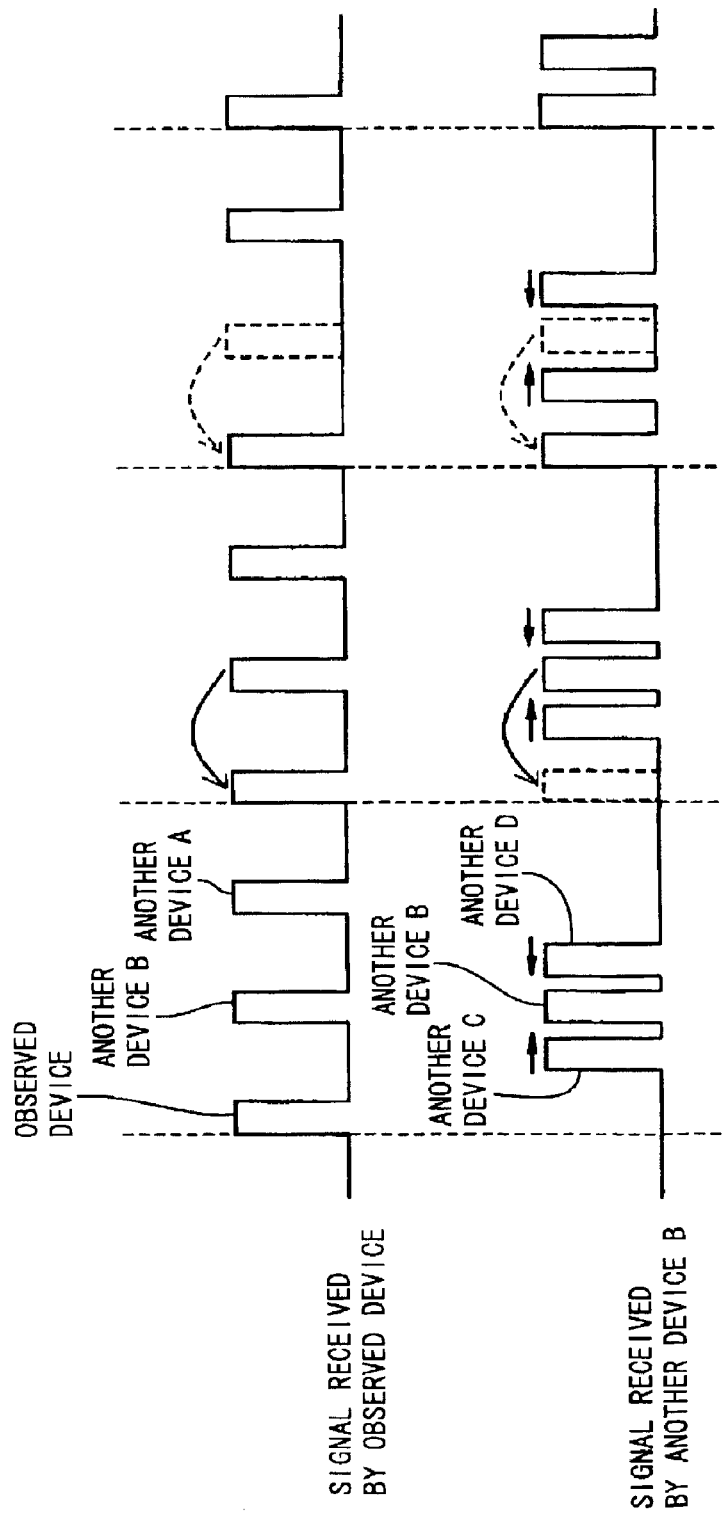
FIG. 12 is a timing chart showing received light signals.

(3) In the case where, as shown in FIG. 11, five photoelectric sensors are disposed and where interfering light from the other two devices A and B enters the observed device 61, interfering light from the observed device 61 does not enter the device B, and interfering light from another devices C and D enters the device B, there is a possibility of the observed device 61 receiving the influence of interference if only the interference avoidance operation using the second shift pattern or the like is performed. That is, the device B may largely shift its light-projecting time by executing a shift in accordance with the second shift pattern in order to avoid interfering light from the devices C and D, resulting in an overlap on the light-projecting time of the observed device 61, as shown in FIG. 12.

A study was made on conditions for enabling an interference avoidance operation while setting the ordinary period of light-projecting timing to six times the light-projecting time. The reason for setting the ordinary period to six times the light-projecting time is because if the period is shorter than six times the light-projecting time, there is a possibility of failure to avoid an interfering state even if an interference avoidance operation described below is executed, and because if the period is excessively long, the response time is disadvantageously long. Therefore the ordinary period is set to six times the light-projecting time as the shortest time period necessary for avoiding interference.

Figure 13:
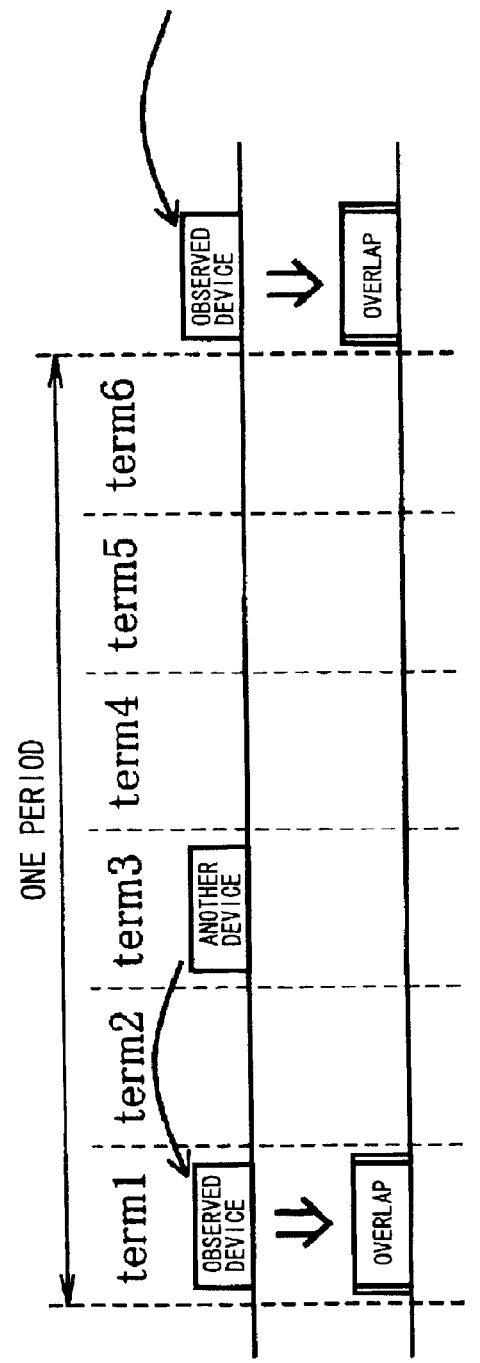
FIG. 13 is a timing chart showing a received light signal in the case where the time of arrival of interfering light from another device overlaps the light-projecting time of the observed device.

Referring to FIG. 13, in the case where the light-projecting period is divided into six sub-periods referred to as terms 1 to 6 hereinafter, and where a shift in accordance with the second shift pattern is executed by setting the amount of forward shift to two terms, a condition of an overlap on the light-projecting time of the observed device 61 as a result of execution of the interference avoidance operation of another device corresponds to a case where another device largely shifts the light-projecting time in accordance with the second shift pattern when the light-projecting time of the observed device 61 exists in the term 1, and when the light-projecting time of another device exists in the term 3.

Figure 14:
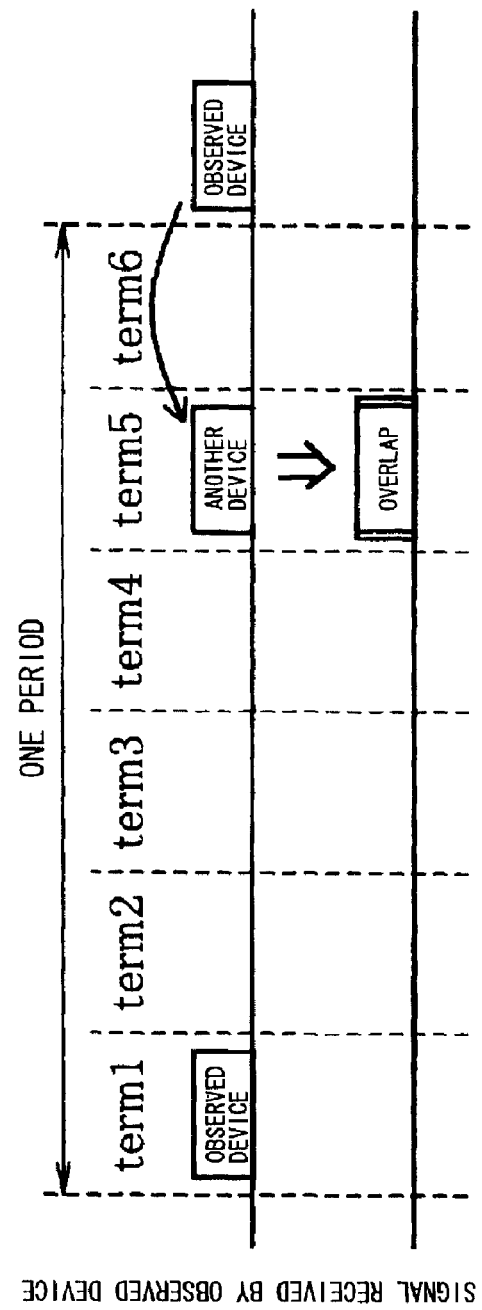
FIG. 14 is a timing chart showing a received light signal in the case where the light-projecting time of the observed device overlaps the time of arrival of interfering light from another device.

The overlap condition also corresponds to a case where when interfering light from another device is generated in the term 5 as shown in FIG. 14, the observed device 61 largely shifts the light-projecting time in accordance with the second shift pattern.

Figure 15:
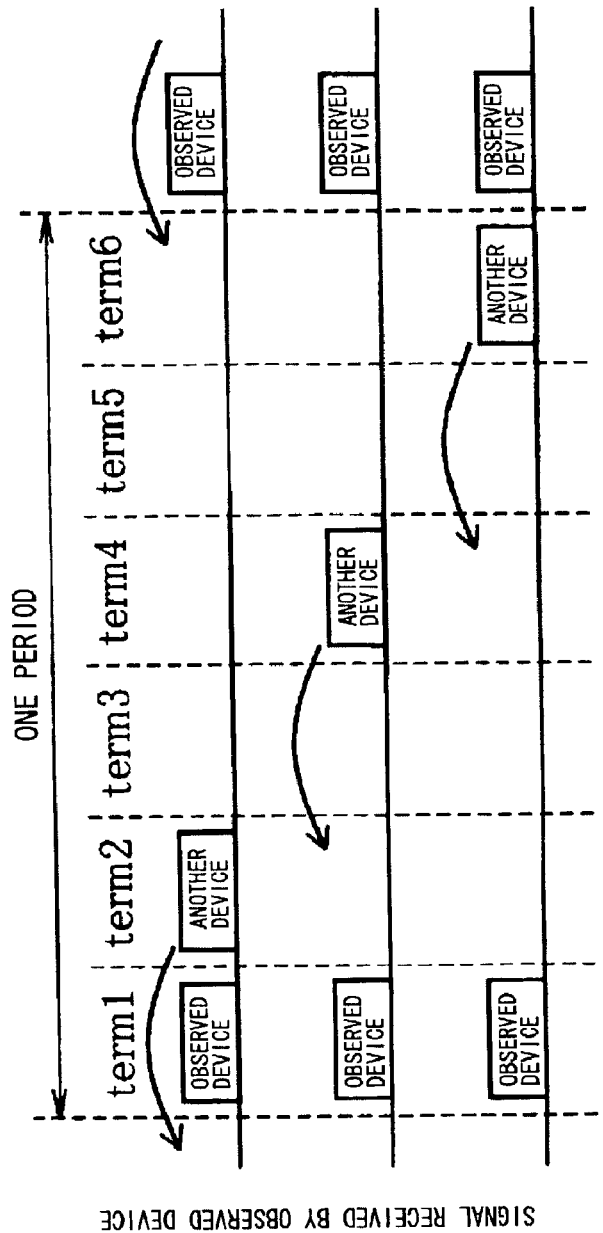
FIG. 15 is a timing chart showing received light signals in the case where the times of arrival of interfering light from another devices do not overlap the light-projecting time of the observed device.

Therefore the condition for avoiding overlap between the light-projecting time of the observed device 61 and the time when interfering light arrives corresponds to a case such as shown in FIG. 15 where interfering light is generated in one of the terms 2, 4, and 6 while the light-projecting time of the observed device 61 is set in the term 1. Under this condition, there is no possibility of overlap between the light-projecting time of the observed device 61 and the time of arrival of interfering light from any of another devices irrespective of which one of the observed device 61 and another devices executes an interference avoidance operation.

If interfering light comes from only one of another devices, it is possible to avoid interfering light by controlling the light-projecting timing so as to satisfy the above-described positional relationship. However, if interfering light comes from two of another devices, there is a need to further specify the positional relationship between the light-projecting time of the observed device and interfering light from another devices.

Figure 16:
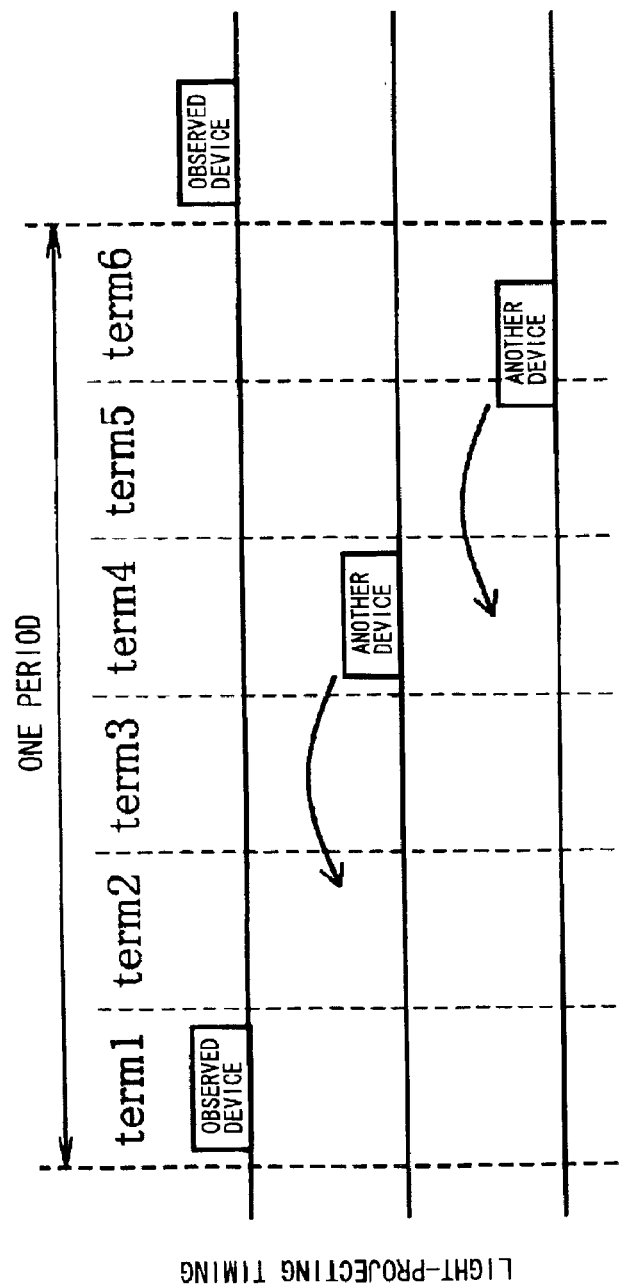
FIG. 16 is a timing chart showing received light signals in the case where the interval between the times of arrival of light-projecting time from other two devices is equal to or smaller than two terms.

(4) In the case where the interval between interfering lights from another devices is smaller than two terms as shown in FIG. 16, a shift in accordance with a third shift pattern is executed by controlling the light-projecting time so that the time of arrival of interfering light from another device closer to the light-projecting time of the observed device 61 is set in the term 4. In this case, since the interval between the interfering lights between another devices is short, no overlap on the light-projecting time of the observed device occurs even if the time of arrival of interfering light from the second of another devices is largely shifted in accordance with the second shift pattern.

Figure 17:
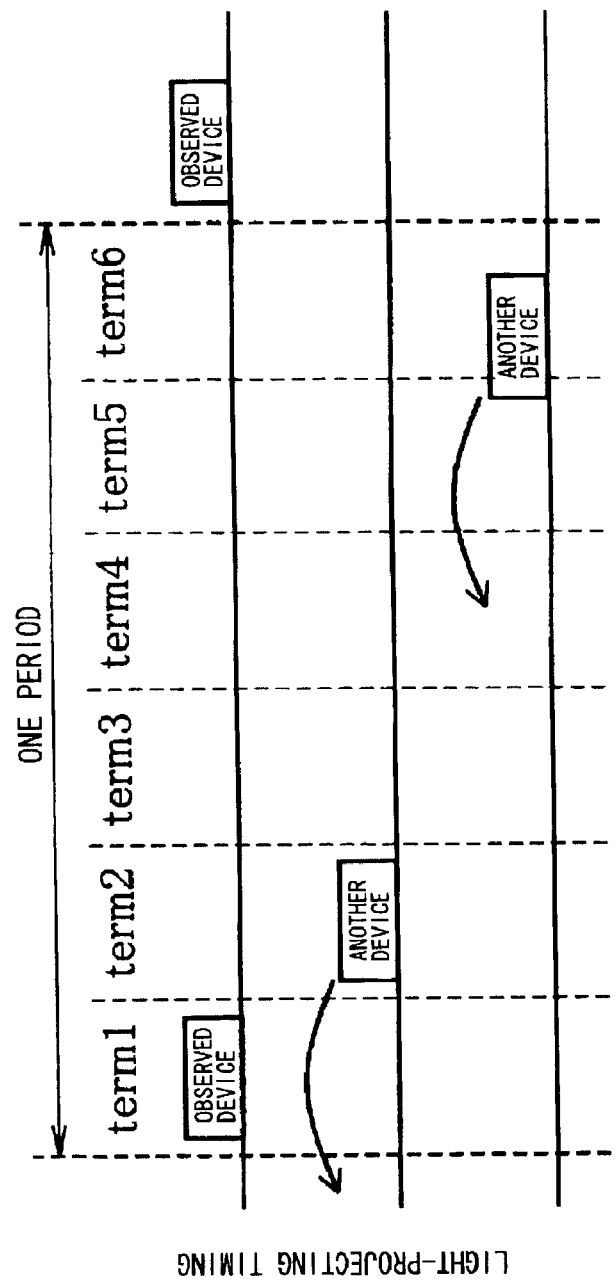
FIG. 17 is a timing chart showing received light signals in the case where the interval between the times of arrival of light-projecting time from other two devices exceeds two terms.

(5) In the case where the interval between interfering lights from another devices is larger than two terms as shown in FIG. 17, a shift in accordance with a fourth shift pattern is executed by controlling the light-projecting time so that the time of arrival of interfering light from another device closer to the light-projecting time of the observed device 61 is set in the term 2. In this case, since the time of arrival of interfering light from the second of another devices does not exist before the term 4, no overlap on the light-projecting time of the observed device occurs even though the time of arrival of interfering light from the second of another devices is largely shifted in accordance with the second shift pattern.

(6) In the case where the interval between interfering lights from another devices is equal to two terms, this state occurs as an intermediate state between the states (4) and (5) and the time of arrival of interfering light form either of another devices may be set in the term 2 and interference may be avoided by executing a shift in accordance with the third shift pattern.

Thus, according to this embodiment, if interfering light from other one or two devices is detected, a most suitable one of the above-described first to fourth shift patterns is selected to execute an interference avoidance operation. This embodiment is characterized by executing an interference avoidance operation in the above-described manner.

The functions of the above-described arrangement will now be described. This embodiment is an example of an arrangement capable of reliably avoiding the interference problem if the number of another devices from which interfering light comes is limited to two.

Figure 18:
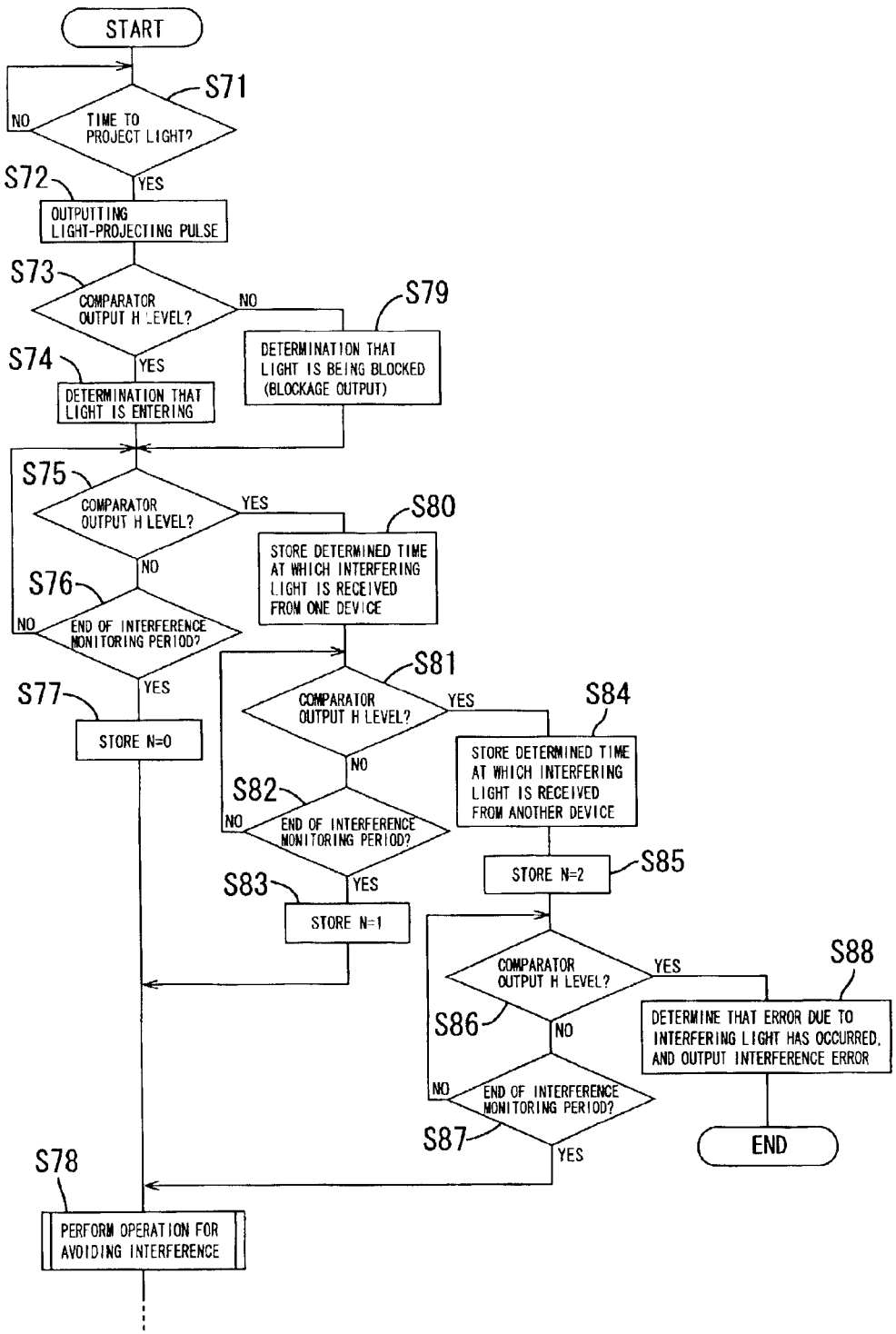
FIG. 18 is a flowchart showing main process performed by a CPU.

FIG. 18 is a flowchart of the operation relating to the present invention in the operation of the CPU 62. Referring to FIG. 18, at a time in accordance with the light-projecting timing (YES in S71), the CPU 62 outputs a light-projecting pulse (S72), makes a determination as to whether the output from the comparator 67 is high level (S73), determines that light is being blocked if the output is low level (NO in S73), and outputs a blockage output (S79).

If the output from the comparator 67 is high level (YES in S73), the CPU 62 determines that light is entering (S74) and monitors entrance of interfering light during the predetermined interfering light monitoring period. That is, the CPU 62 makes a determination as to whether the output from the comparator 67 is high level (S75). If the specified interfering light monitoring period ends while the output from the comparator 67 at low level is maintained, the CPU 62 stores N=0 (no interfering light) (S77) and executes an interference avoidance operation (S78).

Figure 19:
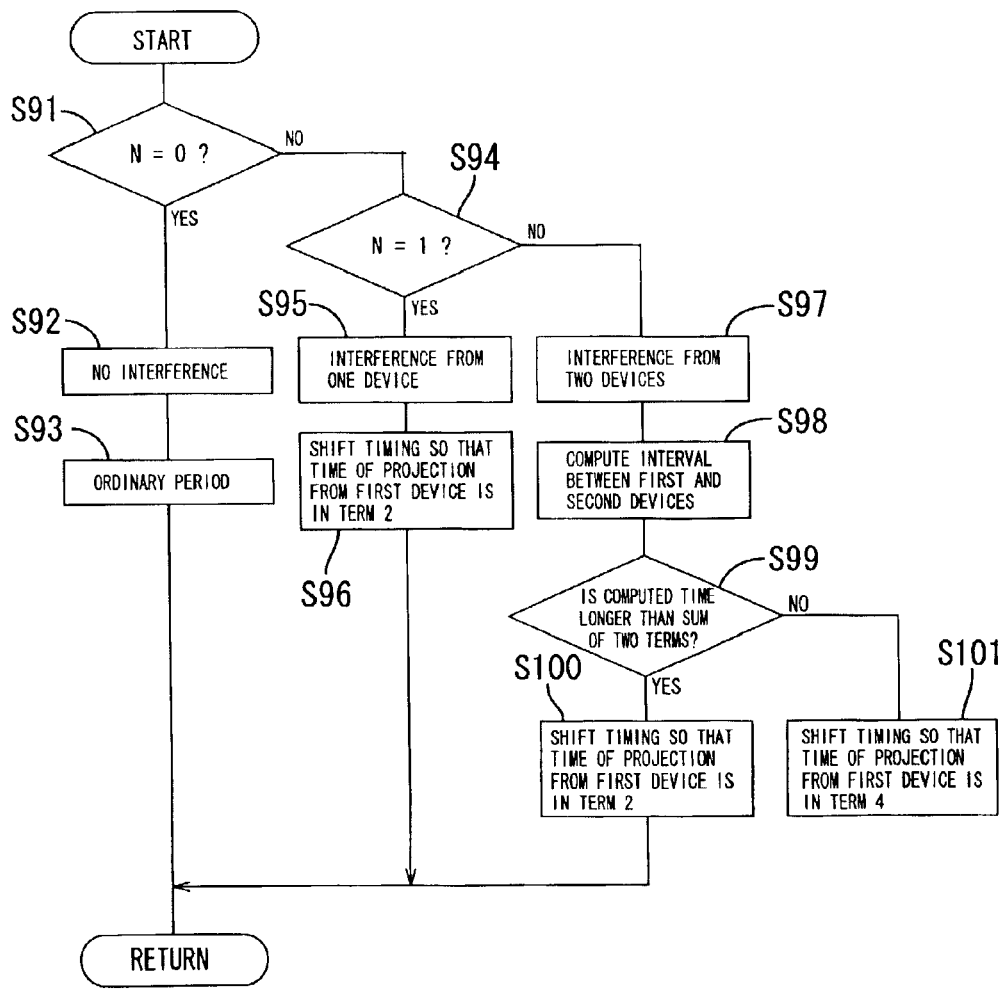
FIG. 19 is a flowchart showing an interference avoidance operation performed by the CPU.
Figure 20:
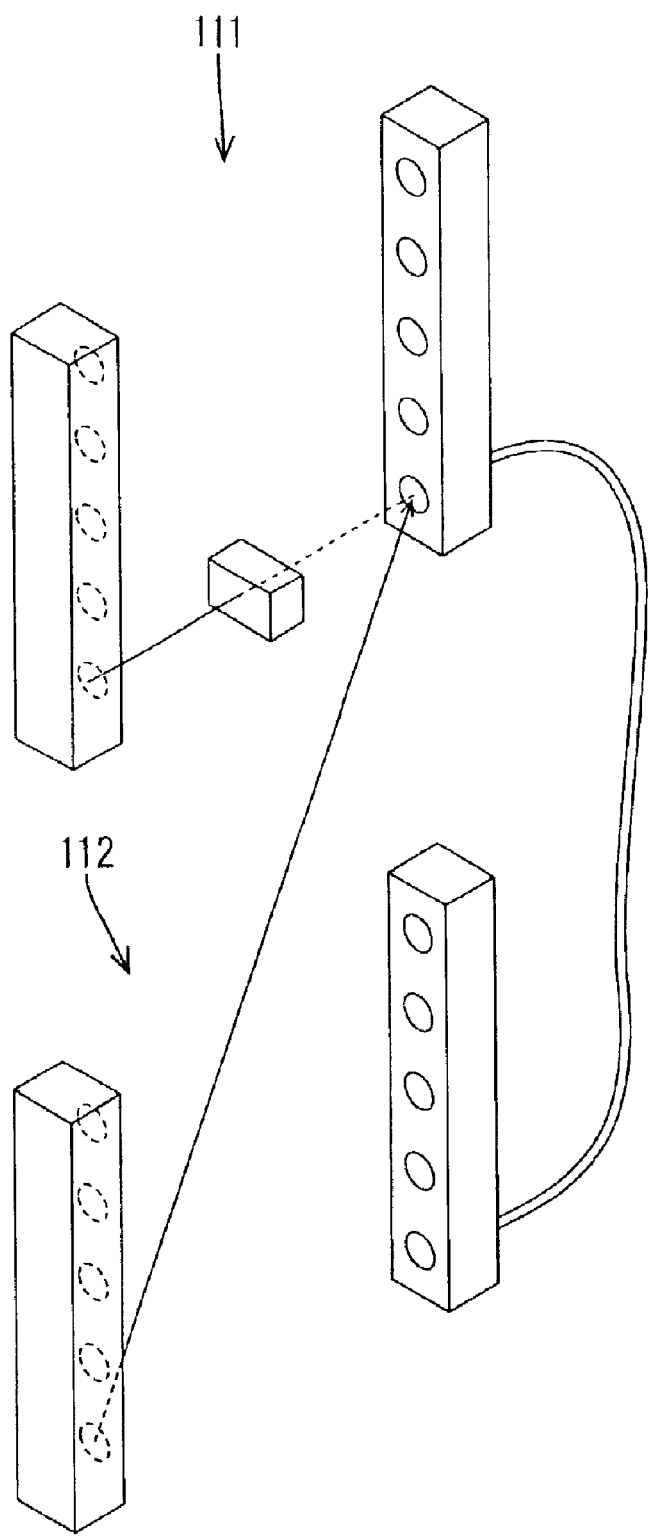
FIG. 20 is a perspective view of the construction of a conventional multiple-axis photoelectric sensor.

FIG. 19 shows the interference avoidance operation performed by the CPU 62. Referring to FIG. 19, if N=0, the CPU 62 determines that no interfering light comes from another devices (YES in S91) and projects light in the ordinary period (S93).

Referring again to FIG. 18, if the output from the comparator 67 becomes high level in the interfering monitoring period (YES in S75), the CUP 62 stores the time at which it determines that interfering light from one of another devices is received (S80). This determination time is obtained for identification of one of the above-described six terms divided from the light-projecting period to which the time of arrival of interfering light corresponds.

The CPU 62 checks whether the output from the comparator 67 becomes high level (S81). If the interfering light monitoring period ends without the comparator 67 output becoming high level (YES in S82), the CPU 62 stores N=1 (entrance of interfering light from one device) (S83) and executes an interference avoidance operation (S78).

That is, as shown in FIG. 19, if N=1 (YES in S94), the CPU 62 determines that interfering light from one of another devices has been received (S95) and executes, for example, a shift of the light-projecting time in accordance with the first shift pattern to set the time of arrival of interfering light in the term 2 (S96). In this case, the time in which the time of arrival of interfering light is set may alternatively be the term 4 or the term 6.

In the case where the state in which the output from the comparator 67 becomes high level occurs two times in the interfering light monitoring period as shown in FIG. 18 (YES in S81), the CPU 62 stores the time at which it determines that interfering light from another of another devices is received (S84) and stores N=2 (entrance of interfering light from two devices) (S85). The CPU 62 also makes a determination as to whether the output from the comparator 67 becomes high level (S86), and executes an interference avoidance operation (S78) if the interfering light monitoring period ends without the comparator 67 output becoming high level (YES in S87).

That is, referring to FIG. 19, if each of N=0 and N=1 is not satisfied (NO in S94), the CPU 62 determines that interfering light from another of another devices has entered (S97) and computes the interval between the interfering lights from the two of another devices (S98). At this time, if the computation result is shorter than the length corresponding to two terms (NO in S99), the CPU 62 executes a shift in accordance with the third shift pattern by controlling the light-projecting timing so that the time of arrival of interfering light from the first of another devices is set in the term 4 while avoiding overlap on the light-projecting time of the observed device 61 even if the time of arrival of interfering light from the second of another devices is shifted in accordance with the second shift pattern.

If the interval between the interfering lights from the two of another devices is longer than the length corresponding to two terms (YES in S99), the CPU 62 executes a shift in accordance with the fourth shift pattern by controlling the light-projecting timing so that the time of arrival of interfering light from the first of another devices is set in the term 2 since overlap on the light-projecting time of the observed device 61 can be avoided even if the time of arrival of interfering light from the second of another devices is shifted in accordance with the second shift pattern.

In this case, if the interval between the interfering lights from the two of another devices is longer than the length corresponding to two terms, control using the third shift pattern may be performed. This method, however, increases the necessary number of terms and therefore has the drawback of increasing the light-projecting period and, hence, the response time.

Referring to FIG. 18, if interfering light from the third device in another devices is detected in the interference monitoring period (YES in S86), the CPU 62 determines that an error due to interfering light has occurred and outputs an interference error result (S88). This is because while an interference avoidance operation can be executed with respect to interfering light from two of another devices in this embodiment, an interference avoidance operation cannot be executed with respect to interfering light from three or more of another devices. An interference avoidance operation may be executed with respect to interfering light from three or more of another devices by predicting all possible points to which the time of arrival of interfering light from any of all another devices may be shifted, and by controlling the light-projecting timing so as to avoid shifting to such points. In the description with reference to FIGS. 18 and 19, the description of a mode of the operation with respect to the second shift pattern in which the light-projecting time is shifted by jumping the time of arrival of interfering light existing before the light-projecting time in the case where the times of arrival of interfering light from another devices are about to simultaneously overlap the light-projecting time was omitted.

According to the above-described embodiment, when interfering light from one of another devices is detected during the non-projecting period even though an interfering light is shifted due to a mutual interference avoidance operations, a shift in accordance with a shift pattern is executed by controlling the light-projecting timing of the observed device so the light-projecting time of the observed device and the time of arrival of interfering light from another device are in such a relationship that no overlap occurs therebetween, thus preventing the time of arrival of interfering light from any of another devices and the light-projecting time of the observed device from overlapping each other, in contrast with the conventional arrangement in which there is a possibility of overlap between the light-projecting time of one device and the time of arrival of interfering light from another device due to an interference avoidance operation performed by another device.

Also, in the case where interfering light enters the observed device from other two devices, if the time interval between the interfering lights from the two devices is larger than the large amount of shift by which the time of arrival of interfering light from the second of the other two devices is shifted in accordance with the second shift pattern, a shift in accordance with the fourth shift pattern is executed by controlling the light-projecting time of the observed device so that this light-projecting time is set immediately before the time of arrival of interfering light from the first of another devices, thereby preventing an excessive increase in light-projecting period, in contrast with the arrangement in which only a shift in accordance with the third shift pattern is executed such that the light-projecting time of the observed device is before the time of arrival of interfering light from another devices shifted by a certain amount.

<Other Embodiments>

The present invention is not limited to the embodiments thereof described above with reference to the accompanying drawings. For example, embodiments such as those described below are also included in the technical scope of the present invention, and various changes and modifications other than those described below may be made without departing from the scope of the invention.

(1) In the above-described first embodiment, the blank period is changed by being reduced on condition that interfering light is detected at two consecutive times with respect to each of the optical axes. Alternatively, for example, the blank period tb may be changed on condition that interfering light is detected one time or at three or more consecutive times.

(2) In the first embodiment, the blank period tb may be changed not only by being reduced but also by being increased. Also, the same effect may be achieved by changing the interval ta between the pulses of the blockage detection timing signal.

(3) In the above-described second embodiment, the pattern for shifting the light-projecting timing by jumping the time of arrival of interfering light may be such that the time of arrival of interfering light existing after the light-projecting timing is jumped.

(4) The arrangement of the second embodiment may be applied to a multiple-axis photoelectric sensor in which a plurality of light-projecting elements constitute light-projecting means; a plurality of light-receiving element constitute light-receiving means; and an object existing in a detection area between the light-projecting means and the light-receiving means is detected by successively causing the light-projecting elements to emit light and successively making the light-receiving elements operable. In such a case, the light-receiving means receives a plurality of received light signals with response to emissions of light from the plurality of light-projecting elements during one light-projecting time (one-scan period) in the above-described embodiment, but each received light signal is processed as one received light signal. Also, detection of interfering light during a non-projecting period may be performed on the basis of the logical sum of the received light signals from all the light-receiving elements in a interfering light detection period.

What is claimed is:

1. A multiple-axis photoelectric sensor comprising a plurality of light-projecting elements, a plurality of light-receiving elements provided each opposed to said light-projecting elements to form a plurality of optical axes, light-projecting control means for repeating a light-projecting scan operation including causing said plurality of light-projecting elements to be successively lighted at a predetermined timing, blockage detection means for detecting a blockage of light at each of the optical axes by detecting a received light signal from each of said light-receiving elements in synchronization with lighting of said light-projecting elements opposed to said light-receiving elements and forming the optical axes, and interfering-light detection means for detecting the existence of interfering light based on the received signals from said light-receiving means in a period during which none of said light-projecting elements is lighted, wherein said multiple-axis photoelectric sensor comprises changing means for changing the time at which the light-projecting scan operation is started in the operation of said light-projecting control means when interfering light is detected by said interfering-light detection means.

2. The multiple-axis photoelectric sensor according to claim 1, wherein said changing means shifts the time at which the light-projecting scan operation is started by an amount of time corresponding to half the interval with which said light-projecting elements are lighted when interfering light is detected by said interfering-light detection means.

3. A photoelectric sensor having:
   light-projecting means for performing a light-projecting operation at predetermined timing to irradiate a detection area with light;
   light-receiving means provided in correspondence with said light-projecting means to receive light from said detection area;
   blockage detection means for making a received light signal from said light-receiving means effective in synchronization with the timing of lighting of said light-projecting means corresponding to said light-receiving means, and for detecting a blockage of light in said detection area from the received light signal from said light-receiving means which has been made effective; and
   interfering-light detection means for detecting the existence of interfering light based on the received signal from said light-receiving means during a non-projecting period of said light-projecting means,
   wherein said photoelectric sensor comprises changing means having a plurality of shift patters in which amounts of shift and directions of shifts of said light-projecting timing are specified, said changing means selecting one of said shift patterns such that even if timing of detection of interfering light from another photoelectric sensor detected by said interfering-light detection means is shifted by execution of a shift in accordance of any of the shift patterns in said another photoelectric sensor, the timing of detection of the interfering light and the timing of projection of light from this photoelectric sensor do not overlap each other, said changing means changing the light-projecting timing in accordance with the selected shift pattern.

4. The photoelectric sensor according to claim 3, wherein in a case where the interfering light from said another photoelectric sensor detected by said interfering-light detection means is about to overlap the light-projecting timing of said light-projecting means, said changing means executes a shift in accordance with the first shift pattern whereby the light-projecting timing is shifted by a small amount away from the interfering light;
   in a case where interfering lights from other two photoelectric sensors are about to overlap the light-projecting timing from opposite directions, said changing means executes a shift in accordance with the second shift pattern whereby the light-projecting timing is shifted to jump one of the interfering lights; and
   in a case where the interfering light from said another photoelectric sensor exists at a position distanced by a predetermined amount from the light-projecting timing larger than the amount of shift in said second shift pattern, said changing means executes a shift in accordance with the third shift pattern whereby the light-projecting timing is shifted so that the position distanced by the predetermined amount from the interfering light is maintained even if the timing of detection of the interfering light from said another photoelectric sensor is shifted.

5. The photoelectric sensor according to claim 4, wherein if the interval between the interfering lights from the other two photoelectric sensors is larger than the amount of shift in the second shift pattern in a case where said changing means shifts the light-projecting timing with respect to the interfering lights from the other two photoelectric sensors, said changing means executes a shift in accordance with the fourth shift pattern with priority over the shift in accordance with the third shift pattern whereby the light-projecting timing is shifted so that one of the interfering lights from the other two photoelectric sensors closer to the light-projecting timing is set adjacent to the light-projecting timing opposite from the direction of shift in the second shift pattern.

6. The photoelectric sensor according to claim 3, comprising:
   count means for counting the number of interfering lights from other photoelectric sensors detected by said interfering-light detection means during one non-projecting period; and
   alarm means for notifying an inability to prevent interference if the count value of said count means exceeds the number at which interference can be avoided.

7. The photoelectric sensor according to claim 4, comprising:
   count means for counting the number of interfering lights from other photoelectric sensors detected by said interfering-light detection means during one non-projecting period; and
   alarm means for notifying an inability to prevent interference if the count value of said count means exceeds the number at which interference can be avoided.

8. The photoelectric sensor according to claim 5, comprising:
   count means for counting the number of interfering lights from other photoelectric sensors detected by said interfering-light detection means during one non-projecting period; and
   alarm means for notifying an inability to prevent interference if the count value of said count means exceeds the number at which interference can be avoided.

9. The photoelectric sensor according to claim 3, wherein said light-projecting means has a plurality of light-projecting elements and successively causes the light-projecting elements to project light; said light-receiving means has a plurality of light-receiving means corresponding to said light-projecting elements; and said blockage detection means makes a received light signal from each of said light-receiving element effective in synchronization with the timing of lighting of each of light-projecting elements corresponding to the light-receiving element, and detects a blockage of light in said detection area from the received light signals from said light-receiving elements which have been made effective, and
   the time period between the time at which the light-projecting element in the first rank in said light-projecting means projects light and the time at which the light-projecting element in the last rank projects light is set as one cycle of light-projecting timing.

10. The photoelectric sensor according to claim 4, wherein said light-projecting means has a plurality of light-projecting elements and successively causes the light-projecting elements to project light; said light-receiving means has a plurality of light-receiving means corresponding to said light-projecting elements; and said blockage detection means makes a received light signal from each of said light-receiving element effective in synchronization with the timing of lighting of each of light-projecting elements corresponding to the light-receiving element, and detects a blockage of light in said detection area from the received light signals from said light-receiving elements which have been made effective, and the time period between the time at which the light-projecting element in the first rank in said light-projecting means projects light and the time at which the light-projecting element in the last rank projects light is set as one cycle of light-projecting timing.

11. The photoelectric sensor according to claim 5, wherein said light-projecting means has a plurality of light-projecting elements and successively causes the light-projecting elements to project light; said light-receiving means has a plurality of light-receiving means corresponding to said light-projecting elements; and said blockage detection means makes a received light signal from each of said light-receiving element effective in synchronization with the timing of lighting of each of light-projecting elements corresponding to the light-receiving element, and detects a blockage of light in said detection area from the received light signals from said light-receiving elements which have been made effective, and the time period between the time at which the light-projecting element in the first rank in said light-projecting means projects light and the time at which the light-projecting element in the last rank projects light is set as one cycle of light-projecting timing.

12. The photoelectric sensor according to claim 6, wherein said light-projecting means has a plurality of light-projecting elements and successively causes the light-projecting elements to project light; said light-receiving means has a plurality of light-receiving means corresponding to said light-projecting elements; and said blockage detection means makes a received light signal from each of said light-receiving element effective in synchronization with the timing of lighting of each of light-projecting elements corresponding to the light-receiving element, and detects a blockage of light in said detection area from the received light signals from said light-receiving elements which have been made effective, and the time period between the time at which the light-projecting element in the first rank in said light-projecting means projects light and the time at which the light-projecting element in the last rank projects light is set as one cycle of light-projecting timing.

13. The photoelectric sensor according to claim 7, wherein said light-projecting means has a plurality of light-projecting elements and successively causes the light-projecting elements to project light; said light-receiving means has a plurality of light-receiving means corresponding to said light-projecting elements; and said blockage detection means makes a received light signal from each of said light-receiving element effective in synchronization with the timing of lighting of each of light-projecting elements corresponding to the light-receiving element, and detects a blockage of light in said detection area from the received light signals from said light-receiving elements which have been made effective, and the time period between the time at which the light-projecting element in the first rank in said light-projecting means projects light and the time at which the light-projecting element in the last rank projects light is set as one cycle of light-projecting timing.

14. The photoelectric sensor according to claim 8, wherein said light-projecting means has a plurality of light-projecting elements and successively causes the light-projecting elements to project light; said light-receiving means has a plurality of light-receiving means corresponding to said light-projecting elements; and said blockage detection means makes a received light signal from each of said light-receiving element effective in synchronization with the timing of lighting of each of light-projecting elements corresponding to the light-receiving element, and detects a blockage of light in said detection area from the received light signals from said light-receiving elements which have been made effective, and the time period between the time at which the light-projecting element in the first rank in said light-projecting means projects light and the time at which the light-projecting element in the last rank projects light is set as one cycle of light-projecting timing.

\* \* \* \* \*